United States Patent [19]

Nakase et al.

[11] 4,417,271
[45] Nov. 22, 1983

[54] DEMODULATOR CIRCUIT FOR COLOR TELEVISION SIGNALS OF PAL SYSTEM

[75] Inventors: Yoshimori Nakase, Sakai; Takayuki Sagishima, Suita, both of Japan

[73] Assignee: Matsushita Electric Industrial Co., Ltd., Osaka, Japan

[21] Appl. No.: 286,756

[22] Filed: Jul. 27, 1981

[30] Foreign Application Priority Data

Jul. 30, 1980 [JP] Japan .................................. 55-105464

[51] Int. Cl.³ .............................................. H04N 9/50
[52] U.S. Cl. ..................................................... 358/24

[58] Field of Search ...................................... 358/24, 18

[56] References Cited

U.S. PATENT DOCUMENTS 4,337,477  6/1982  Sagishima et al. ................... 358/24

Primary Examiner—Richard Murray
Attorney, Agent, or Firm—Wenderoth, Lind & Ponack

[57] ABSTRACT

A demodulator circuit of PAL type color television signals which is arranged so as to demodulate the correct polarity R−Y signal without controlling the $f_H/2$ line switching pulse in phase.

5 Claims, 4 Drawing Figures

FIG. 4.

| STATE LINE | (a) | | | (b) | | |
|---|---|---|---|---|---|---|
| | n | n+1 | n+2 | n | n+1 | n+2 |
| PHASE OF ALTERNATING BURST SIGNAL | | | | | | |
| INPUT PHASE OF SWITCH 1(2) TERMINAL (A) | | | | | | |
| OUTPUT OF 1/2 FREQUENCY DIVIDER | | | | | | |
| OUTPUT PHASE OF SWITCH 1(2) | | | | | | |
| OUTPUT OF PHASE DISCRIMINATOR (10) | | | | | | |
| OUTPUT OF SWITCH 4 (11) | | | | | | |
| OUTPUT PHASE OF SWITCH 2(5) | | | | | | |

FIG. 2.

| STATE LINE | (a) | | | (b) | | |
|---|---|---|---|---|---|---|
| | n | n+1 | n+2 | n | n+1 | n+2 |
| PHASE OF ALTERNATING BURST SIGNAL | | | | | | |
| INPUT PHASE OF SWITCH 1(2) TERMINAL(A) | | | | | | |
| OUTPUT OF 1/2 FREQUENCY DIVIDER | | | | | | |
| OUTPUT PHASE OF SWITCH 1(2) | | | | | | |
| OUTPUT PHASE OF SWITCH 3(4) | | | | | | |
| OUTPUT OF PHASE DISCRIMINATOR | | | | | | |
| OUTPUT PHASE OF SWITCH 2(5) | | | | | | |

4,417,271

DEMODULATOR CIRCUIT FOR COLOR TELEVISION SIGNALS OF PAL SYSTEM

BACKGROUND OF THE INVENTION

This invention relates to a demodulator circuit for color television signals of PAL system.

As is generally known, in the PAL system, the demodulating axis for one of the two color difference signals, i.e. the R−Y signal, is sent with the phase inverted for each horizontal scanning period (referred to as 1H below). One method used to demodulate such a color difference signal at the correct polarity is to provide a switch which operates at one half of the frequency (refered to as $f_H/2$ below) of the horizontal frequency (refered to as $f_H$ below) and which is changed over with each 1H. In order to drive this switch, a flip-flop is used for dividing the horizontal pulse, and a $f_H$ line switching pulse is generated. As is also well known, the flip-flop is controlled so as to keep the phase of the $f_H/2$ line switching signal in correct correspondence to the transmission line information sent by the color synchronizing signal.

In such a circuit, there arises a difficulty in that the PAL switch stops forever in an attempt to control the phase of the $f_H/2$ line switching pulse, as mentioned above.

SUMMARY OF THE INVENTION

The object of this invention is to provide a demodulator circuit of color television signals which is arranged so as to demodulate the correct polarity R−Y signal without controlling the $f_H/2$ line switching pulse in phase.

This object is achieved according to this invention by providing a color demodulator circuit for color television signals in the PAL system, comprising:

a frequency divider which is supplied with a horizontal pulse train and which outputs a switching pulse train having a frequency equal to one half of the horizontal scanning frequency;

a first switching means supplied with a carrier chrominance signal in the R−Y axis;

a first phase inverter supplied with said carrier chrominance signal in the R−Y axis, said first switching means being connected to one input of an R−Y demodulator used to demodulate R−Y color signals extracted from television signals, and having a switch control terminal supplied with the output of said frequency divider, wherein said first switching means alternatively feeds said carrier chrominance signal in the R−Y axis and an inverted carrier chrominance signal with its polarity inverted from said first phase inverter to said R−Y demodulator for each horizontal scanning period;

a second switching means supplied with a reference subcarrier in the R−Y axis;

a second phase inverter supplied with said reference subcarrier in the R−Y axis, said second switching means alternatively feeds said reference subcarrier in the R−Y axis and the reference subcarrier with the polarity inverted from said reference subcarrier in the R−Y axis to another input of said R−Y demodulator; and a control means connected to said second switching means to control second switching circuit, so that the polarity of the reference subcarrier to one input of said R−Y demodulator is identical with the polarity of the R−Y signal to another input.

According to a further development of the invention, said control means comprises:

a third switching circuit supplied with a burst signal out of PAL type color television signals;

a third phase inverter supplied with said burst signal out of PAL type color television signals, so that said third switching circuit alternatively feeds said burst signal and a phase inverted version thereof from said third phase inverter to an output terminal of said third switching circuit for each horizontal scanning period by said switching pulse train derived from said frequency divider;

a phase discriminator for detecting said output of said third switching circuit using a reference subcarrier in the R−Y axis whose phase is different from the average phase of the alternating burst signal by 90°; and a control circuit supplied with the output of said phase discriminator, wherein said control circuit controls said second switching circuit according to the polarity of said output of said phase discriminator.

A control means according to this invention may also include a third switching means which has a switch control terminal coupled to said switch control terminal of said first switching circuit, wherein said switching pulse derived from said frequency divider controls said third switching circuit together with said first switching circuit, so that the output of said phase discriminator is either positive or negative in polarity regardless of the horizontal line.

According to a still further development of this invention, said control means comprises:

a phase discriminator for detecting the alternating burst signal out of PAL type color television signals using a reference subcarrier in the R−Y axis whose phase is different from the average phase of said alternating burst signal by 90°;

a fourth switching circuit connected to the output of said phase discriminator; and a polarity inverter connected to the output of said phase discriminator, wherein said fourth switching circuit alternatively switches an output signal of said phase discriminator and a polarity inverted version thereof with said switching pulse train derived from said frequency divider; and a control circuit supplied with the output of said fourth switching circuit, wherein said control circuit controls said second switching circuit according to the polarity of said output of said fourth switching circuit.

A control means according to this invention may also include a fourth switching circuit which has a switch control terminal coupled to said switch control terminal of said first switching circuit, wherein said switching pulse derived from said frequency divider controls said fourth switching circuit together with said first switching circuit, so that the output derived from said fourth switching circuit is either positive or negative in polarity regardless of the horizontal line.

BRIEF DESCRIPTION OF THE DRAWINGS

This invention will be better understood from the following description taken in connection with the accompanying drawings in which:

FIG. 2 shows a vector diagram and wave diagram explaining the circuit shown in FIG. 1;

FIG. 4 shows a vector diagram and wave diagram explaining the circuit shown in FIG. 3.

DESCRIPTION OF THE PREFERRED EMBODIMENTS

Figure 1:
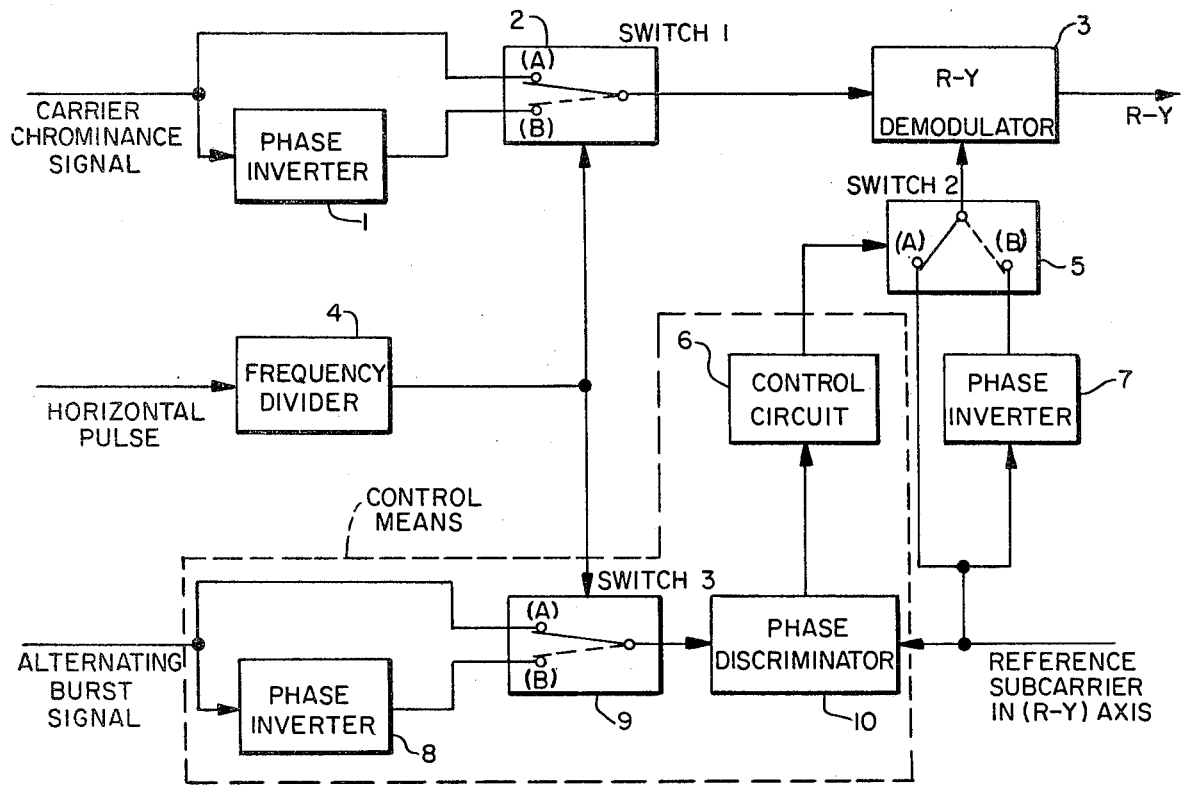
FIG. 1 is a block diagram of a color signal demodulating circuit in accordance with the present invention.

As shown in FIG. 1, an R−Y chrominance carrier color signal passed through a delay line matrix composed of a 1H delay line (not shown in FIG. 1) and difference subtracting circuit (not shown in FIG. 1) is supplied to one input terminal (A) of a first switching circuit 2 and at the same time is supplied to another input terminal (B) of the switching circuit 2 through a phase inverter 1. The switch control terminal of the first switching circuit is supplied with a switching pulse having a frequency which is equal to half that of the horizontal frequency (that is to say, $f_H/2$) derived from a frequency divider 4, which divides the horizontal frequency in two, and the output from the first switching circuit 2 is fed to an R−Y demodulator 3.

On the other hand, the reference subcarrier to demodulate the R−Y signal, whose phase, if the average phase of alternating burst signal is 180°, is 90°, is applied to one input terminal (A) of a second switching circuit. At the same time, the reference subcarrier is inverted by a phase inverter 7, and the inverted reference subcarrier whose phase is −90° is applied to another input terminal (B) of the second switching circuit. This second switching circuit 5 is controlled by the switching signal from a control circuit 6 so that the phase of the output of the second switching circuit 5 is either +90° or −90°, and the output of the second switching circuit 5 is applied to the R−Y demodulator 3.

In FIG. 2, assuming that, the phase of PAL system alternating burst signal becomes +135°, −135°, +135°, −135°, . . . for the nth line, (n+1)th line, (n+2)th line, (n+3)th line, . . . , respectively, the phase of the input signal of the input terminal (A) of the first switching circuit 2 becomes +90°, −90°, +90°, −90° . . . and that of the other input terminal (B) becomes −90°, +90°, −90°, +90°.

There are two cases, namely: the output signal of the frequency divider 4, that is the $f_H/2$ switching signal, becomes a high logic level (referred to as "H" below), a low logic level (referred to as "L" below), "H" . . . in accordance with nth line, (n+1)th line, (n+2)th line, . . . and the $f_H/2$ switching signal becomes "L", "H", "L". We call the former case state "(a)" and the latter case state "(b)". Assuming that, when the $f_H$ switching signal is "H", the first switching circuit 2 is switched to the input terminal (A) and when it is "L", the first switching circuit 2 is switched to the input terminal (B), then in state (a), the phase of the output signal from the first switching circuit is 90° at any 1H period, and in state (b), the output is conversely −90° at any 1H period.

The phase of the alternating burst signal applied to the input terminal (A) of the third switching circuit 9 is alternately +135° and −135°, and the phase of the burst signal through a phase inverter 8 to the input terminal (B) is alternately −45° and the +45°, and $f_H/2$ switching pulse is applied to the switch control terminal of the third switching circuit.

Assuming that, when the $f_H/2$ switching signal is "H", the third switching circuit 9 is switched to the input terminal (A), and when it is "L", the third switching circuit 9 is switched to the input terminal(B). Then, in state (a), the phase of the burst signal at the output terminal of the third switching circuit 9 is alternately +135° and +45° and in state (b), it is alternately −45° and −135°.

The burst detecting output of a phase discrimination circuit 10 which performs homodyne detecting of the burst signal using the reference subcarrier whose phase is +90° takes on a positive polarity in state (a), and takes on a negative polarity in state (b). By this difference, a control circuit 6 controls the connection of the switching circuit 5 so that the output of R−Y demodulator 3 can obtain an R−Y color difference signal having correct polarity under both states (a) and (b). That is to say, in state (a) the control circuit 6 switches the second switch 5 to the input terminal (A), and in stage (b) the control circuit 6 switches it to the input terminal (B), so that the phase of the R−Y reference subcarrier applied to the R−Y demodulator 3 becomes as shown in FIG. 2.

Figure 3:
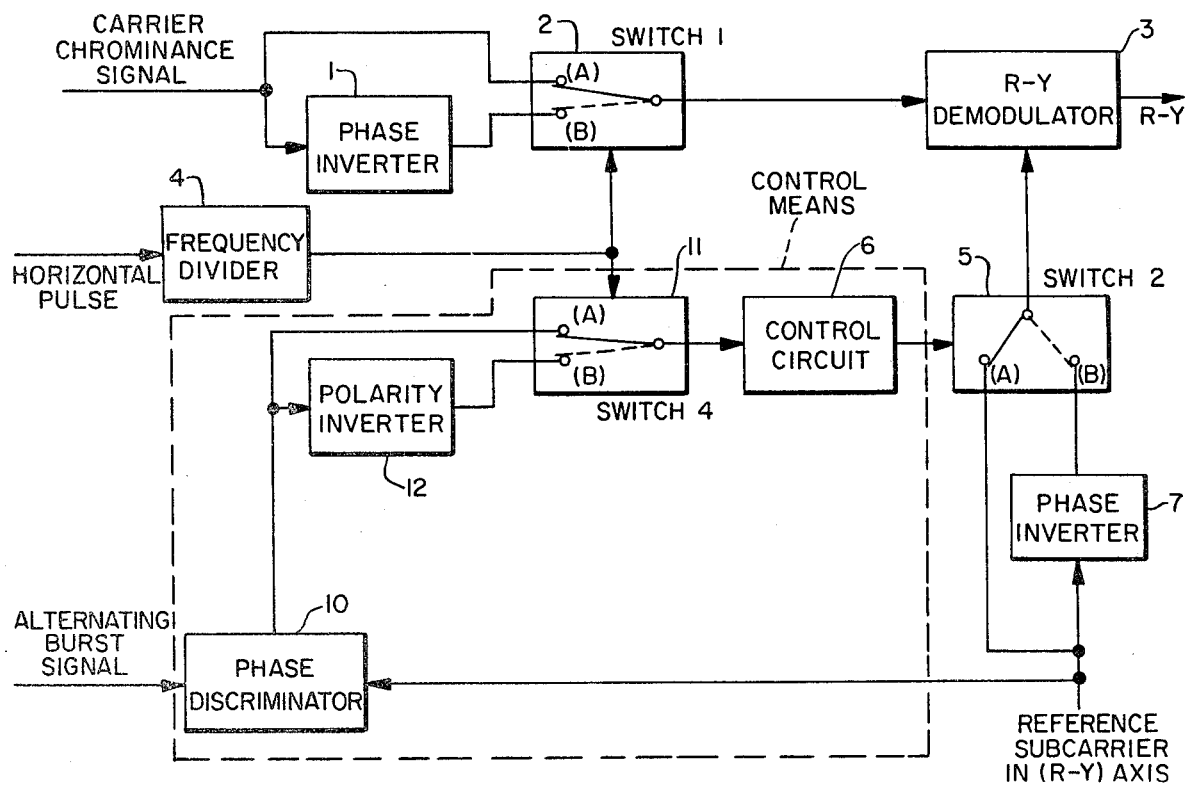
FIG. 3 is a block diagram of a further color signal demodulating circuit in accordance with the present invention.

FIG. 3 shows another embodiment of this invention and FIG. 4 shows a vector and wave diagram of the embodiment.

Identical parts to those shown in FIG. 1 and FIG. 2 bear the same reference numerals and their explanations are therefore omitted. This embodiment may be characterized as follows:

In the state (a) and state (b) mentioned above, this embodiment obtains different burst detecting outputs in polarity. The alternating burst signal is detected synchronously by the phase discriminator 10 using the reference subcarrier whose phase is +90°, and the burst detecting output signal is directly fed to the input terminal (A) of a fourth switching circuit 11 and a signal with the polarity inverted from that of the output signal of the discriminator 10 is fed to another input terminal (B). The $f_H/2$ switching pulse is supplied to the switch control terminal of the fourth switching circuit 11. Assuming that, when the $f_H/2$ switching signal is "H", the fourth switching circuit 11 selects the input terminal (A), and when it is "L", the fourth switching circuit 11 selects the input terminal (B). Then, in state (a), the polarity of the output signal from the fourth switching circuit 11 is positive regardless of the horizontal line, and in state (b), inversely, the polarity is negative regardless of the horizontal line as shown in FIG. 4.

As stated above, this invention allows the realization of a new demodulator circuit for color television signals of PAL system, in which the correct polarity (R−Y) signal can be obtained with just the generation of the $f_H/2$ line switching signal, for which phase control is not exercised.

What is claimed is:
1. A color demodulating apparatus for PAL type color television signals, said apparatus comprising:
a frequency divider which is supplied with a horizontal pulse train and which outputs a switching pulse train having a frequency which is equal to one half of a horizontal scanning frequency;
a first switching means which is supplied with a carrier chrominance signal in the R−Y axis;
a first phase inverter which is supplied with said carrier chrominance signal in the R−Y axis, said first switching means being connected to one input of an R−Y demodulator used to demodulate R−Y color signals extracted from television signals, and said first switching means having a switch control terminal supplied with an output of said frequency divider, wherein said first switching means alterna- tively feeds said carrier chrominance signal in the R−Y axis and an inverted carrier chrominance signal with its polarity inverted from that of said carrier chrominance signal through said first phase inverter to said R−Y demodulator for each horizontal scanning period;

a second switching means which is supplied with a reference subcarrier in the R−Y axis;

a second phase inverter which is supplied with said reference subcarrier in the R−Y axis, wherein said second switching means alternatively feeds said reference subcarrier in the R−Y axis and the reference subcarrier with the polarity inverted from that of said reference subcarrier in the R−Y axis through said second phase inverter to another input of said R−Y demodulator; and a control means connected to said second switching means to control second switching means, wherein the polarity of the reference subcarrier fed to one input of said R−Y demodulator is identical to the polarity of the R−Y signal fed to said other input of said R−Y demodulator.

2. A color demodulating apparatus according to claim 1, wherein said control means comprises:

a third switching means which is supplied with a burst signal out of PAL type color television signals;

a third phase inverter which is supplied with said burst signal out of PAL type color television signals, wherein said third switching means alternatively feeds said burst signal and a phase inverted version thereof through said third phase inverter to an output terminal of said third switching means for each horizontal scanning period, said third switching means being controlled by said switching pulse train which is derived from said frequency divider;

a phase discriminator for detecting said output of said third switching means using a reference subcarrier in the R−Y axis whose phase is different from the average phase of said burst signal by 90°; and a control circuit which is supplied with an output of said phase discriminator, wherein said control circuit controls said second switching means according to the polarity of said output of said phase discriminator.

3. A control means according to claim 2, wherein said third switching means has its switch control terminal coupled to said switch control terminal of said first switching means, and wherein said switching pulse train derived from said frequency divider simultaneously controls both said third switching circuit and said first switching circuit, wherein said output of said phase discriminator is either positive or negative in polarity regardless of horizontal line.

4. A color demodulating apparatus according to claim 1, wherein said control means comprises:

a phase discriminator for detecting a burst signal out of PAL type color television signals using a reference subcarrier in the R−Y axis whose phase is different from the average phase of said burst signal by 90°;

a fourth switching means which is connected to an output of said phase discriminator;

a polarity inverter which is connected to said output of said phase discriminator, wherein said fourth switching means alternatively feeds said output of said phase discriminator and a polarity inverted version thereof through said polarity inverter to an output terminal of said fourth switching means for each horizontal scanning period, said fourth switching means being controlled by said switching pulse train output from said frequency divider; and a control circuit which is supplied with an output of said fourth switching means, wherein said control circuit controls said second switching means according to the polarity of said output of said fourth switching means.

5. A control means according to claim 4, wherein said fourth switching means has its switch control terminal coupled to said switch control terminal of said first switching means, and wherein said switching pulse train derived from said frequency divider controls both said fourth switching means and said first switching means, wherein said output derived from said fourth switching means is either positive or negative in polarity regardless of horizontal line.

* * * * *